Sept. 24, 1957 T. WYCKOFF 2,807,171
AUTOMATIC TRANSMISSION
Filed Sept. 14, 1955 4 Sheets-Sheet 1
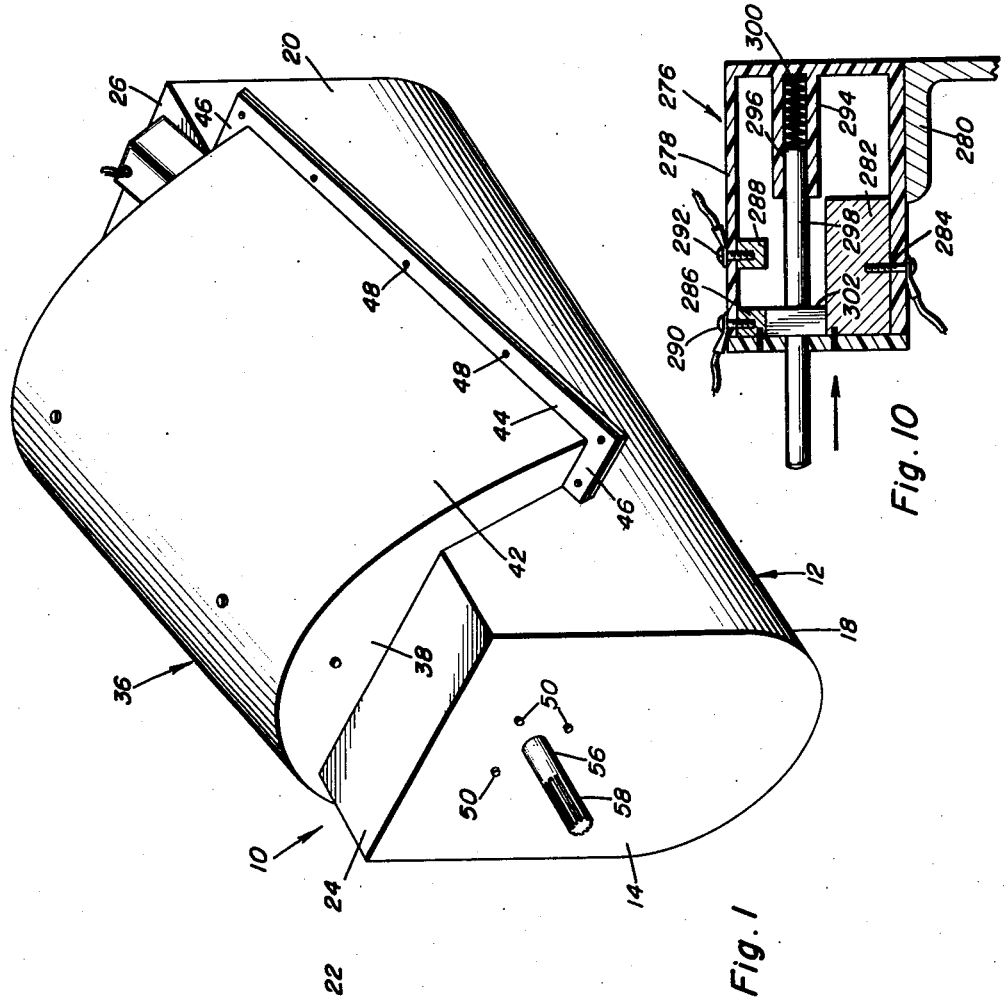
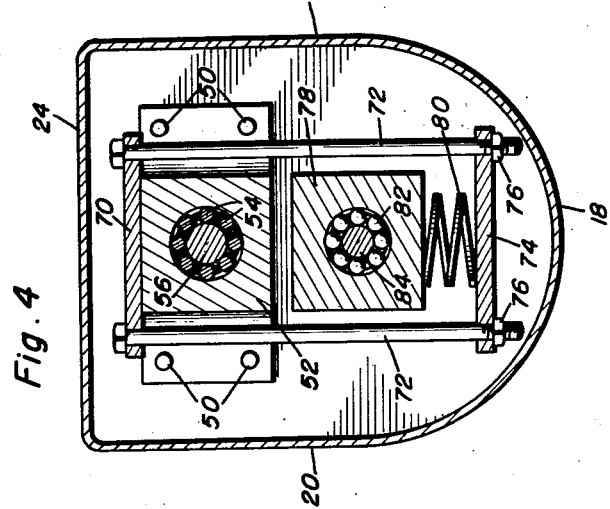
Theodore Wyckoff
INVENTOR.

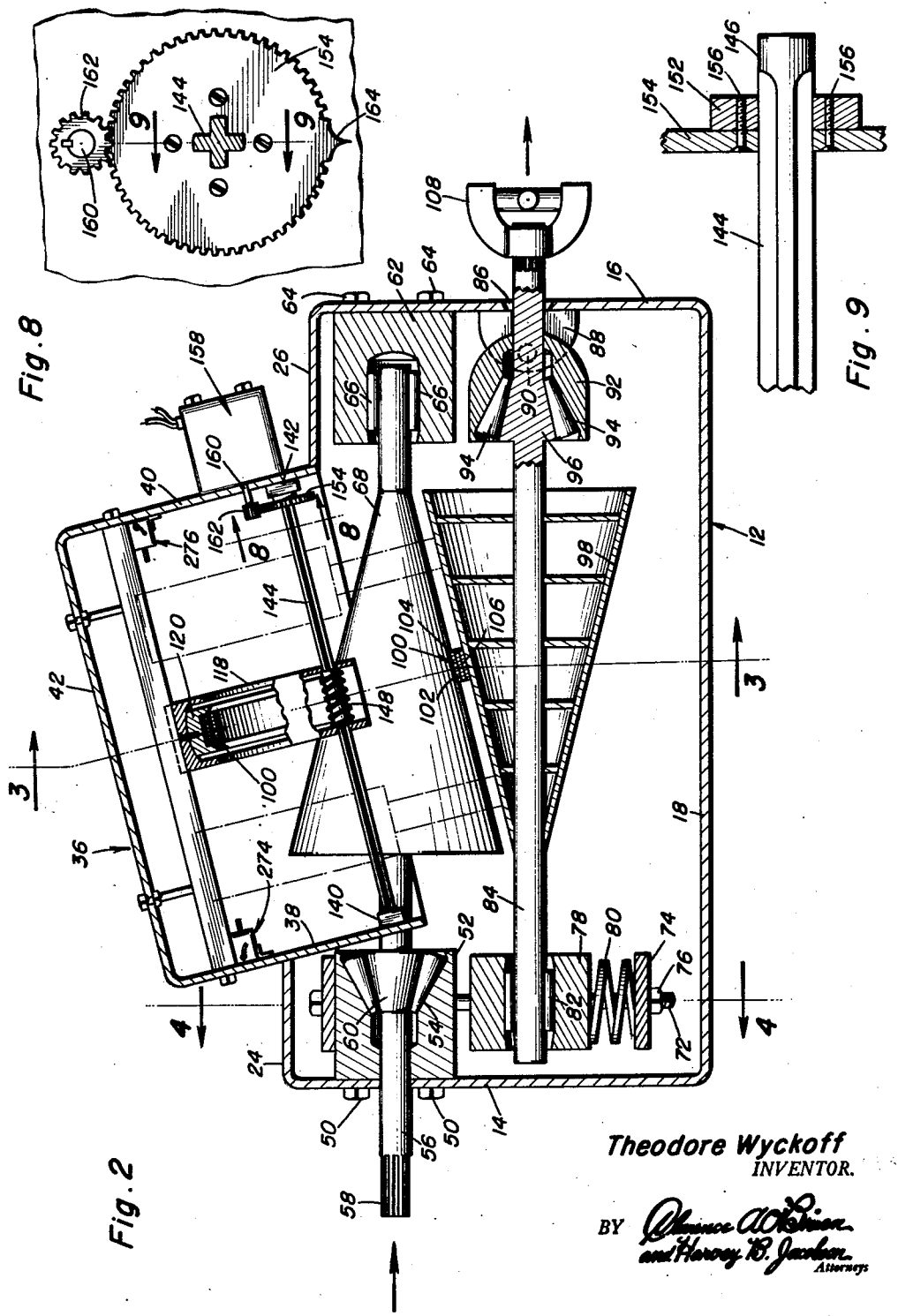

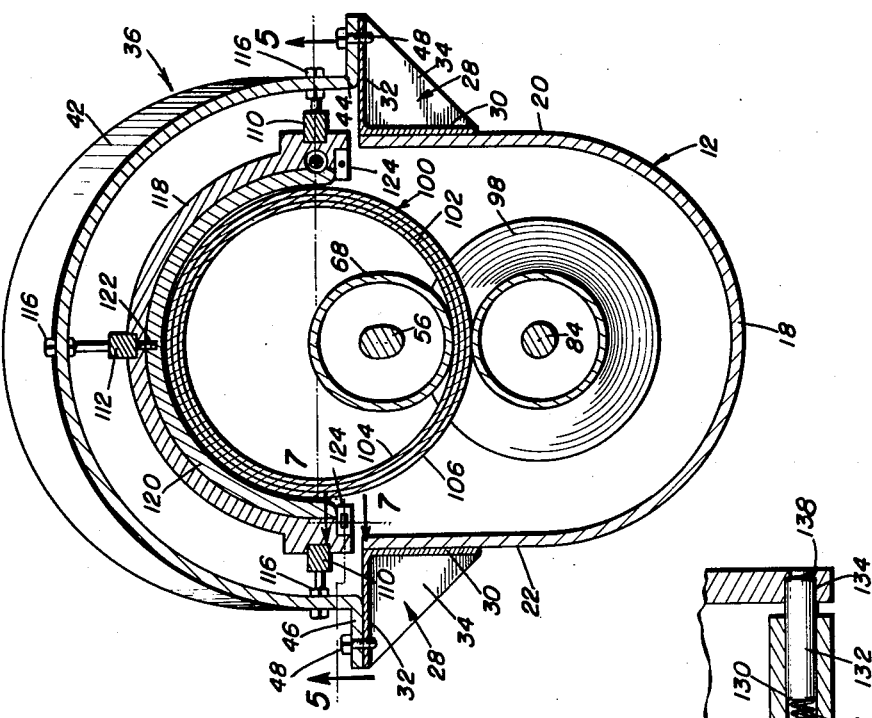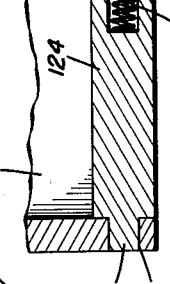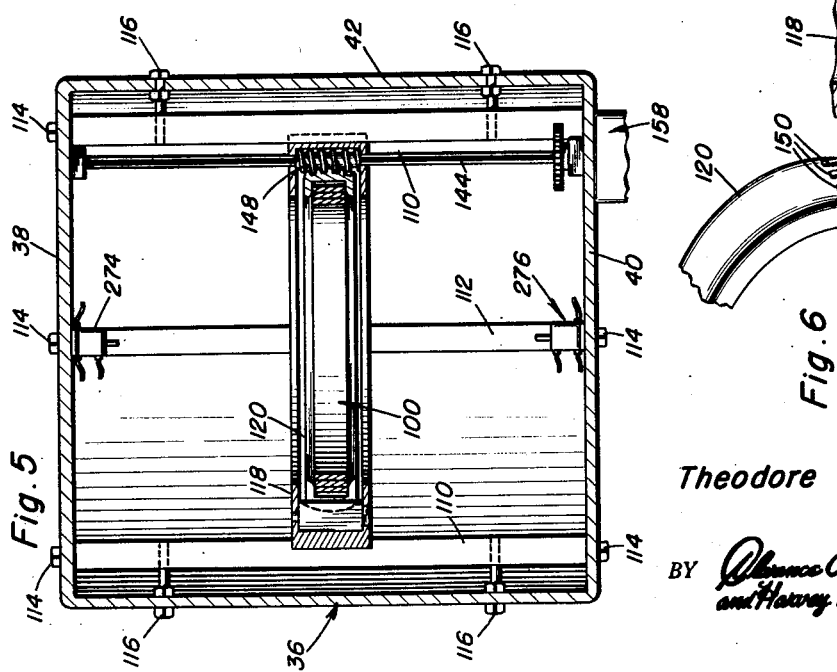

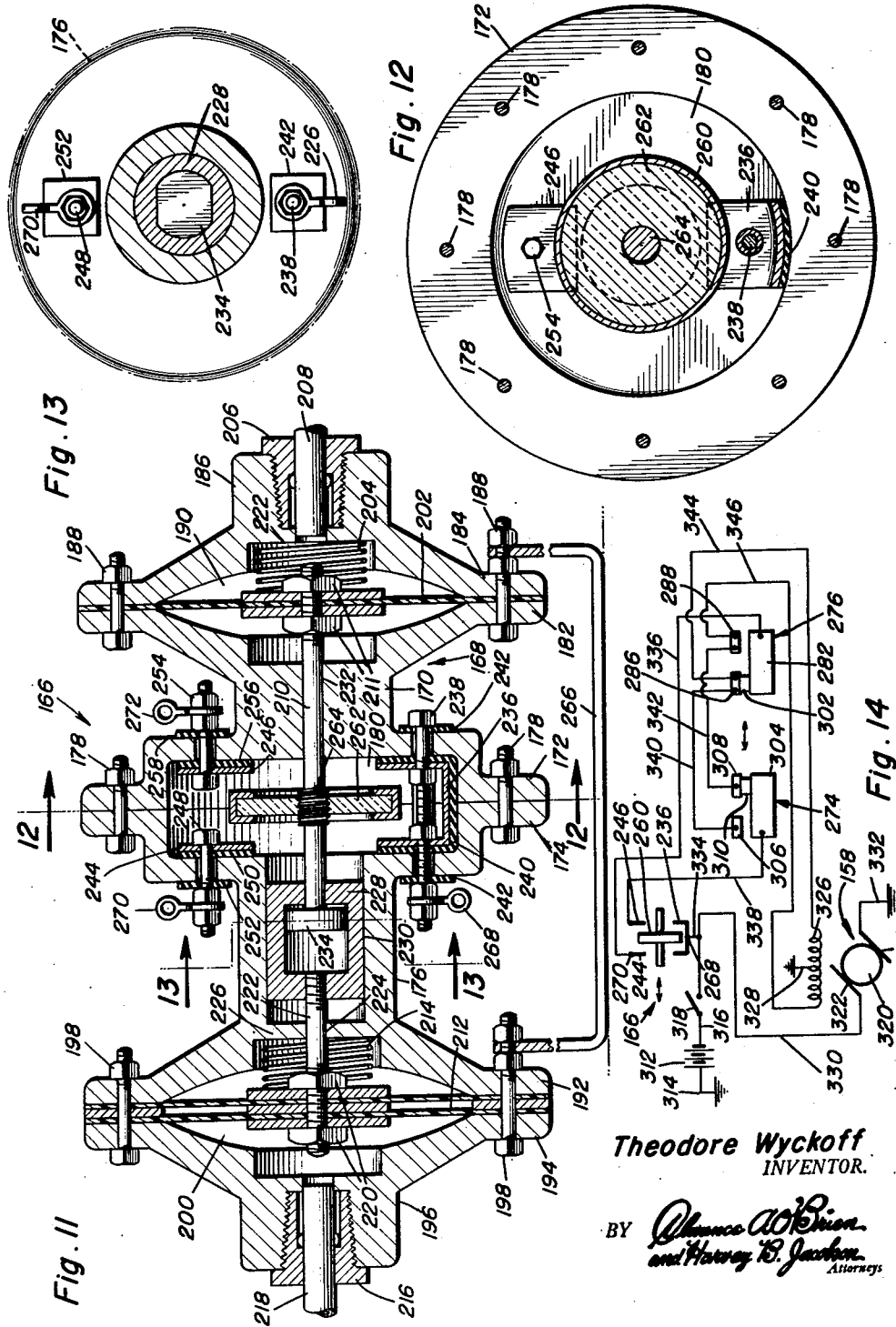

United States Patent Office 2,807,171
Patented Sept. 24, 1957

2,807,171

AUTOMATIC TRANSMISSION

Theodore Wyckoff, Los Angeles, Calif.

Application September 14, 1955, Serial No. 534,182

11 Claims. (Cl. 74—192)

This invention relates in general to new and useful improvements in automotive transmissions, and more specifically to an improved automatic transmission for use in conjunction with internal combustion engines.

The primary object of this invention is to provide an improved automatic transmission of the friction cone type which is so constructed whereby the normal friction ring of the cone type transmission is automatically shifted with respect to the cones thereof in response to loads placed upon the internal combustion engine to which the automatic transmission is coupled.

Another object of this invention is to provide an automatic transmission of the friction cone type having a shiftable friction ring, the transmission including means for selectively moving the friction ring with respect to the cones, the means including a master control unit connected to an internal combustion engine and operated in response to variations in exhaust manifold pressures and intake manifold vacuums, the control system also including limit switches whereby movement of the friction ring at opposite ends of the friction cones is restricted.

Another object of this invention is to provide an improved transmission of the friction cone type wherein there is provided an extremely simple means for effecting the shifting of and positioning the friction ring whereby the desired drive ratio may be readily obtained.

Yet another object of this invention is to provide an improved mechanism for shifting a friction ring of a friction cone type transmission, the means including means for tilting the friction ring with respect to the friction cone whereby the friction cones automatically shift the friction ring in the desired direction.

A further object of this invention is to provide an improved transmission of the friction cone type, one of the friction cones being mounted on a pivotally mounted shaft which is spring loaded toward the other friction cone, whereby a maximum pressure is exerted on the friction ring at all times to ensure proper frictional engagement between the friction ring and the two friction cones of the transmission.

A still further object of this invention is to provide an improved shifting mechanism for a friction ring of a friction cone type transmission, the shifting mechanism including a guide loosely engaging the friction ring and having means for actuating the same, the guide and associated parts thereof being liftable off the friction ring and removable from the remainder of the transmission.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front perspective view of the automatic transmission which is the subject of this invention and shows the general details of the housing thereof including the movable cover for the housing, also being illustrated is the drive end of the drive shaft;

Figure 2 is a longitudinal sectional view on an enlarged scale taken through the center of the transmission of Figure 1 and shows the specific relationship between the drive and driven shafts of the transmission as well as the relationship between the drive cone, the driven cone and the friction ring disposed between these two cones, there also being illustrated the specific details of the mounting of both the friction ring and the driven shaft;

Figure 3 is an enlarged transverse vertical sectional view taken substantially upon the plane indicated by the section line 3—3 of Figure 2 and shows the relationship between the friction ring and the drive cone, and the relationship between the friction ring and the guide means for the friction ring;

Figure 4 is an enlarged transverse vertical sectional view taken substantially upon the plane indicated by the section line 4—4 of Figure 2 and shows the manner in which a forward end of the driven shaft is mounted for rotation and at the same time, is spring urged toward the drive shaft, whereby the drive and driven cones may be urged together to clamp the friction ring therebetween to increase the friction drive between these parts;

Figure 5 is an enlarged horizontal sectional view taken substantially upon the plane indicated by the section line 5—5 of Figure 3 through the cover of the housing and shows the manner in which the friction ring is guidingly mounted and the manner in which the guide means for the friction ring is mounted within the cover for effecting tilting of the friction ring;

Figure 6 is an enlarged fragmentary perspective view of one end of a guide for the friction ring and shows the details of a gear segment formed thereon;

Figure 7 is an enlarged fragmentary vertical sectional view taken substantially upon the plane indicated by the section line 7—7 of Figure 3 and shows the manner in which the guide of Figure 6 is retained in a guide housing for pivotal movement;

Figure 8 is an enlarged fragmentary vertical sectional view taken substantially on the plane indicated by the section line 8—8 of Figure 2 and shows the specific details of the drive for the gear shaft including the means for limiting rotation of the gear shaft in the event the automatic controls therefor fail;

Figure 9 is an enlarged fragmentary vertical sectional view taken substantially upon the plane indicated by the section line 9—9 of Figure 8 and shows the specific connection between the gear shaft and a drive gear therefor;

Figure 10 is an enlarged fragmentary vertical sectional view through one of the limit switches for the friction ring guide means and shows the general details thereof;

Figure 11 is an enlarged sectional view taken through a manifold servo master switch assembly which controls the positioning of the friction ring, the specific details of the switch assembly being clearly illustrated;

Figure 12 is an enlarged transverse vertical sectional view taken substantially upon the plane indicated by the section line 12—12 of Figure 11 and shows the specific details of the shiftable contacts;

Figure 13 is an enlarged fragmentary vertical sectional view taken substantially upon the plane indicated by the section line 13—13 of Figure 11 and shows the specific mounting of a control piston interlocking the intake manifold vacuum diaphragm control shaft with an exhaust manifold pressure diaphragm shaft; and Figure 14 is a wiring diagram for the automatic transmission and shows the manner in which the various control switches operate to control the operation of the drive motor for the gear shaft.

Referring now to the drawings in detail, it will be seen that there is illustrated in Figure 1 the automatic transmission which is the subject of this invention, the transmission being referred to in general by reference numeral 10. The transmission 10 includes a housing which is referred to in general by the reference numeral 12.

The housing 12 includes a front wall 14, a rear wall 16, a generally semicircular bottom wall 18, upstanding side walls 20 and 22, a partial front top wall 24 and a partial rear top wall 26.

The central upper part of the housing 12 is cut away so as to eliminate a major part of the top wall as well as parts of the side walls 20 and 22. Carried by the side walls 20 and 22 are outwardly extending support brackets 28. Each of the support brackets 28 slopes upwardly and rearwardly and includes a vertical attaching flange 30 and a horizontal mounting flange 32. The flanges 30 and 32 are interconnected at longitudinally spaced intervals by suitable gussets 34.

Closing the open upper part of the housing 12 is a removable cover which is referred to in general by the reference numeral 36. The cover 36 includes a front wall portion 38, a rear wall portion 40 and a combined side and top wall 42. Disposed along the lower edges of the combined side and top wall 42 is a flange 44 which has extensions 46 at opposite ends thereof. Each of the flanges 44 overlies a respective one of the flanges 32 and is secured thereto by a plurality of spaced fasteners 48. Thus, by removing the fasteners 48, the cover 36 may be quickly and easily removed from the remainder of the housing 12.

Referring now to Figure 2 in particular, it will be seen that there is secured to the upper part of the front wall 14 on the inner surface thereof by means of fasteners 50, a bearing block 52. The bearing block 52 carries a plurality of roller bearings 54 of the tapered thrust type. Extending through the front wall 14 and the bearing block 52 is a drive shaft 56 which is provided with a splined connection 58 at the forward end thereof for attachment to an automotive engine. The drive shaft 56 includes an enlarged bearing ring 60 on which the rollers 54 ride.

Disposed in longitudinal alignment with the bearing block 52 is a bearing block 62. The bearing block 62 is secured to the inner surface of the rear wall 16 by suitable fasteners 64. Sealed within the bearing block 62 are suitable roller bearings 66 receiving the rear end of the drive shaft 56. Carried by the drive shaft 56 intermediate the bearing blocks 52 and 62 is a drive cone 68. The drive cone 68 is of a maximum diameter at the forward end thereof and tapers rearwardly. The drive cone 68 will be covered with any suitable friction material or may be formed entirely of metal.

Referring now to Figures 2 and 4 in particular, it will be seen that overlying the bearing block 52 is a support plate 70. Suspended from the support plate 70 on opposite sides of the bearing block 52 are suitable hanger bolts 72. The hanger bolts 72 carry at the lower end thereof a support plate 74. The support plate 74 is held in adjusted position by nuts 76 carried on the lower ends of the hanger bolts 72. Mounted below the bearing block 52 is a bearing block 78 which rests upon a spring 80 carried by the support plate 74. While no specific guide means has been illustrated, if desired, the bearing block 78 may be provided with guide means resisting transverse movement thereof and at the same time, permitting vertical movement thereof by the spring 80. Carried by the bearing block 78 is a plurality of roller bearings 82 between which a forward end of a driven shaft 84 is journaled.

Referring once again to Figure 2 in particular, it will be seen that the driven shaft 84 is disposed in generally parallel relation with respect to the drive shaft 56 and that it extends through an opening 86 formed in the rear wall 16, the opening 86 being of a larger size than the driven shaft 84 to permit slight swinging movement thereof.

Carried by the inner surface of the rear wall 16 is a pair of transversely spaced, forwardly projecting ears 88. The ears 88 have pivotally connected thereto by horizontally disposed, transverse pivot pins or trunnions 90 on which there is mounted for swinging movement a bearing block 92. The bearing block 92 is provided with tapered thrust roller bearings 94 which engage a conical bearing ring 96 carried by the driven shaft 84.

Carried by the driven shaft 84 in alignment with the drive cone 68 is a driven cone 98. The driven cone 98 is identical with the drive cone 68, but is in reverse relation relative thereto. It is to be noted that the driven cone 98 is spaced a slight distance below the drive cone 68.

Encircling the drive cone 68 and having a lower portion thereof disposed between the drive cone 68 and the driven cone 98 is a friction ring which is referred to in general by reference numeral 100. The friction ring 100 preferably includes a central reinforcing band 102, an inner friction liner 104 and an outer friction liner 106, the friction liners 104 and 106 engaging the drive cone 68 and the driven cone 98, respectively.

It is pointed out at this time that in the operation of the transmission 10, the drive cone 68 is rotated by means of the drive shaft 56. It in turn rotates the friction ring 100 which then rotates the driven cone 98. The drive cone 68 and the driven cone 98 tightly clamp the friction ring 100 to reduce slippage due to the upward urging of the spring 80 on the bearing block 78. It is pointed out that the limited movement of the driven shaft 84 results in the urging of the spring 80 and that the mounting of the bearing block 92 permits this movement. A universal joint 108 is placed on the rear end of the driven shaft 84 to accommodate for any slight misalignment of the drive shaft 84 and a connecting shaft (not shown) which would be connected to the universal joint 108.

Inasmuch as the forward end of the driven shaft 84 is urged upwardly by the spring 80, and since the friction ring 100 is in the maximum power position when disposed at the rear of the driven cone 98, it will be readily apparent that the maximum leverage afforded by the spring 80 will be at the time of the maximum power drive.

Referring now to Figures 2 and 5 in particular, it will be seen that there is carried by the end walls 38 and 40 of the cover 36 lower guide rails 110 and an upper guide rail 112. The guide rails 110 and 112 are rectangular in cross-section, as is best illustrated in Figure 3, and are secured to their respective end walls 38 and 40 by bolts 114. The guide rails 110 and 112 are also supported intermediate their ends by adjustable fasteners 116 carried by the combination side and top wall 42.

Slidably mounted on the guide rails 110 and 112 is a guide housing 118. The guide housing 118 is of a semicircular configuration in elevation and channel-shaped in cross-section. Mounted within the guide housing 118 is a guide 120. The guide 120 is also of a channel-shaped cross-section and is semicircular in elevation. The guide 120 is mounted in the guide housing 118 for pivotal movement by a vertical pivot pin 122 carried by the extreme upper part of the guide housing 118.

The guide 120 terminates above the lower ends of the guide housing 118, as is best illustrated in Figure 3. Carried by the lower ends of the guide housing 118 are retaining blocks 124 for the guide 120. As is best illustrated in Figure 7, each retaining block 124 is provided at one end with a fixed projection 126 which is received in an opening 128 of the guide housing 118. Slidably mounted in a bore 130 in the opposite end of the retaining block 124 is a lock pin 132. The lock pin 132 is received in a bore 134 in the guide housing 118 opposite the opening 128. The lock pin 132 is spring urged into a locked position with respect to the guide housing 118 by a spring 136 disposed within the bore 130. The lock pin 132 is prevented from passing out through the bore 134 by reducing the bore 134, as at 138.

Carried by the lower part of the front wall 38 at one side thereof is a bearing block 140. Carried by the rear wall 40 in alignment with the bearing block 140 is a similar bearing block 142. Extending between the bearing blocks 140 and 142 and journaled therein is a gear shaft 144 which has the major portion thereof of a cruciform cross-section, as is best illustrated in Figure 8. The end portions of the gear shaft 144 are in the form of journals 146, as is best illustrated in Figure 9.

Slidably carried by the gear shaft 144 is a worm gear 148. The worm gear 148 is disposed within the confines of the guide housing 118 and is retained thereby.

Referring now to Figure 6 in particular, it will be seen that the guide 120 is provided at one end thereof with suitable gear teeth 150 which match the worm gear 148. By rotating the worm gear 148, the guide 120 will be pivoted about the pivot pin 122 with respect to the guide housing 118. Inasmuch as the friction ring 100 is guidedly received in the guide 120, as is best illustrated in Figure 2, it will be seen that when the guide 120 is pivoted, the friction ring 100 is tilted with respect to the drive cone 68 and the driven cone 98. By varying the tilt of the friction ring 100, the drive cone 68 and the driven cone 98 will automatically drive the friction ring 100 either to the left or to the right, as viewed in Figure 2. Inasmuch as the guide 120 and the guide housing 118 are freely movable within the cover 36, it will be seen that the guide housing 118, the guide 120 and the friction ring 100 will move as a unit, the gear 148 being carried along with these three parts.

Referring now to Figure 9 in particular, it will be seen that there is mounted on the rear end of the gear shaft 144 by means of a mounting block 152 a driven gear 154. The driven gear 154 is secured to the block 152 by suitable fasteners 156.

Removably carried by the rear wall 40, as is best illustrated in Figure 2, is a small reversible electric motor 158. The electric motor 158 includes an armature shaft 160 which extends through the rear wall 40. Mounted on the forward end of the armature shaft 160 is a small drive gear 162 which is meshed with the gear 154.

Referring now to Figure 8 in particular, it will be seen that the driven gear 154 is provided with a stop projection 164. The ratio between the drive gear 162 and the driven gear 154 is such that when the driven gear 154 is rotated from an initial position of Figure 8 in either direction, the friction ring 100 will move to the desired end of the cones 68 and 98 slightly in advance of the engagement of the stop projection 164 with the drive gear 162. This is a safety feature in event the controls for the electric motor 158 do not operate, the stop projection 164 preventing the friction ring 100 from moving out from between the cones 68 and 98.

Referring now to Figures 11, 12 and 13 in particular, it will be seen that there is illustrated a servo manifold master control switch which is referred to in general by the reference numeral 166. The master control switch 166 includes a housing which is referred to in general by the reference numeral 168. The housing 168 includes a right housing section 170 which is provided at the left end thereof with an offset attaching flange 172. The attaching flange 172 is secured to a similar attaching flange 174 of a left housing section 176. The attaching flanges 172 and 174 are secured together by suitable fasteners 178 and form therebetween a chamber 180.

Disposed at the right end of the right housing section 170 is an attaching flange 182 which has secured thereto an attaching flange 184 of a cap 186. The attaching flanges 182 and 184 are connected together by suitable fasteners 188 and form therebetween a chamber 190.

The left housing section 176 includes a left attaching flange 192. Secured to the attaching flange 192 is an attaching flange 194 of a cap 196. The attaching flanges 192 and 194 are secured together by suitable fasteners 198 to form therebetween a chamber 200.

Mounted in the chamber 190 and extending transversely thereof is a diaphragm 202, outer portions of the diaphragm 202 being clamped between the attaching flanges 182 and 184. The diaphragm 202 is urged to the left by a spring 204. Secured to the closure cap 186 in communication with the right hand part of the chamber 190 by means of a fitting 206 is a vacuum line 208 which may be conveniently attached to an intake manifold of an internal combustion engine (not shown). Secured to the central part of the diaphragm 202 is a control shaft 210, the control shaft 210 being adjusted relative to the diaphragm 202 by nuts 211 carried thereby on opposite sides of the diaphragm 202.

Extending transversely of the chamber 200 and disposed therein is a multiple thickness diaphragm 212. The diaphragm 212 has the outer part thereof disposed between the attaching flanges 192 and 194 and is clamped therebetween. Seated in the left housing section 176 and urging the diaphragm 212 to the left is a spring 214.

Carried by the cap 196 is a fitting 216 which retains an exhaust manifold pressure line 218 in position with respect to the closure cap 196 and in communication with the left hand side of the chamber 200. The exhaust manifold pressure line 218 will be connected in any desired manner to an exhaust manifold (not shown) of the internal combustion engine.

Adjustably connected to the diaphragm 212 by nuts 220 is a control rod 222. The control rod 222 is in alignment with the control rod 210 and passes through a bore 224 in a partition wall 226. The right hand end of the control rod 222 is connected to a piston-like member 228 which is freely slidable in a bore 230 in the left housing section 176.

The control rod 210 is slidably received in a bore 232 formed in the right housing section 170. The control rod 210 extends through an end of the piston 228 remote from the connection thereof to the control rod 222 and terminates in a smaller piston 234. The two pistons 228 and 234 form a lost motion connection between the control rods 210 and 222.

Mounted in the chamber 180 and secured in place is a U-shaped contact 236. The contact 236 is secured in place by a fastener 238 and is retained in insulated relation with respect to the housing 168 by insulation 240 and 242.

Disposed remote from the U-shaped contact 236 are contacts 244 and 246, the contacts 244 and 246 being disposed in opposed relation and carried by the housing sections 176 and 170, respectively. The contact 244 is retained in place by a fastener 248 and is insulated by means of suitable insulation 250 and 252. The contact 246 is retained in place by a fastener 254 and is insulated with respect to the housing section 170 by insulation 256 and 258.

Carried by the control rod 210 within the chamber 180 is a bridge member 260. The bridge member 260 includes an insulated core 262 which is threadedly engaged on an enlarged threaded portion 264 of the control rod 210.

Due to the connection between the control rod 210 and the control rod 222, it will be readily apparent that the master control switch 166 is normally controlled by the vacuum of the internal combustion engine. However, in the case of insufficient exhaust manifold pressure, the control rod 222 will take over and control the movement of the bridging member 260. Thus, the master control switch 166 is completely controlled by the exhaust and intake manifold pressures of the internal combustion engine to which the transmission 10 is connected.

It is to be noted that the various parts of the housing 168 are connected together by a mounting bracket 266 which extends between a pair of the fasteners 188 and 198. Also, the fastener 238 carries a terminal 268 while the fasteners 248 and 254 carry terminate 270 and 272, respectively.

Referring once again to Figure 2 in particular, it will be seen that there is carried by the front wall 38 of the cover 36 a limit switch 274. A similar limit switch 276 is carried by the rear wall 40. Inasmuch as the two limit switches 274 and 276 are identical, only limit switch 276 will be described in detail.

The limit switch 276 includes an insulated housing 278 which is provided with a mounting bracket 280. Disposed within the lower part of the housing 278 is a contact block 282 which is secured in place by suitable fastener 284, the fastener 284 also functioning as a terminal for the contact block 282.

Carried by a top wall of the housing 278 are longitudinally spaced contact blocks 286 and 288 which are secured in place by fasteners 290 and 292, respectively, the fasteners also functioning as terminals.

The housing 278 includes a projecting boss 294 having a bore 296. Mounted in the boss 294 is one end of a control rod 298 which is spring urged to the left by a spring 300 mounted in the bore 296. The control rod 298 extends through a forward wall of the housing 278 and is engageable by the guide housing 118. Carried by the control rod 298 and normally engaging the front wall of the housing 278 is a movable contact block 302. The contact block 302 normally bridges the space between the contact blocks 282 and 286. However, when moved to the right by the guide housing 118, it will be aligned with the contact block 288 and will bridge the space between that contact block and the contact block 282.

Referring now to Figure 14, it will be seen that there is illustrated a wiring diagram for the control system of the transmission 10. While the limit switch 274 is identical with the limit switch 276, separate reference numerals will be given to the contact blocks thereof in order to avoid confusion. The limit switch 274 includes a fixed contact block 304, and upper contact blocks 306 and 308. The limit switch 274 also includes a sliding contact block 310.

The control circuit for the transmission 10 includes a battery 312 which will be the battery of the automobile in which the transmission 10 is mounted. The battery 312 is grounded by means of the wire 314. Connected to the opposite terminal of the battery 312 is a wire 316 which is connected to an ignition switch 318. The ignition switch 318 will have other wires connected thereto but which are not illustrated for purposes of clarity.

The electric motor 158 includes an armature 320 which is engaged by brushes 322 and 324. The electric motor 158 also includes a field winding 326 which has a center tap 328 which is grounded.

Extending between the ignition switch 318 and the brush 322 is a wire 330. A second wire 332 connects the brush 324 to the ground.

The master control switch is connected in the electrical circuit by means of a wire 334 which connects the U-shaped contact 236 to the wire 330. Extending between the terminal 270 and the contact block 282 is a wire 336. A similar wire 338 extends between the terminal 246 and the contact block 304.

Extending between the contact blocks 306 and 286 and connecting the two together is a wire 340. A similar wire 342 extends between the contact 308 and 288. Connecting the contact block 286 to one end of the field winding 326 is a wire 344. A similar wire 346 connects the contact block 288 to the opposite end of the field winding 326. It is to be noted that when the wire 344 is energized, the flow of current through the field winding 326 will be in one direction and when the flow of current is through the wire 346, the flow of current through the other half of the field winding 326 will be in the opposite direction. This will then cause opposite direction of rotation of the armature 320.

In operation of the automatic controls for the electric motor 158, the bridging member 260 will be shifted either to the right or to the left. When shifted to the right, with the contact blocks 310 and 302 in the positions illustrated, the flow of current will be through the wire 346. This will result in the movement of the friction ring 100 to the left, as viewed in Figure 2. When the friction ring 100 reaches the far left end of its travel, the limit switch 274 will be actuated to move the contact block 310 to the left. This will result in the flow of the current into the wire 344 and the reversing of the electric motor 158.

When the bridging member 260 is moved to the left, flow of current will be through the wire 344. This will result in the driving of the friction ring 100 to the right, as viewed in Figure 2. When the guide housing 118 strikes the control rod 298 of the limit switch 276, the contact block 302 will be shifted to the right and the flow of current will then be through the wire 346 again causing the reversal of the direction of rotation of the electric motor 158.

From the foregoing description of the invention, it will be readily apparent that there has been devised not only a novel means for the mounting of a friction ring of a friction cone type transmission, but also novel means for effectively clamping the friction ring between the cones and means for automatically shifting the friction ring in response to demands of the internal combustion engine to which the transmission is connected. These particular features permit a friction cone type transmission to operate automatically in the desired manner and produce a relatively economical transmission.

The foregoing is considered as illustrative only of the principles of the invention. Further, since numerous modifications and changes will readily occur to those skilled in the art, it is not desired to limit the invention to the exact constructon and operation shown and described, and accordingly, all suitable modifications and equivalents may be resorted to, falling within the scope of the invention as claimed.

What is claimed as new is as follows:

1. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion dsposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment.

2. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, said control shaft being fixedly mounted in said housing for rotation only, said gear being operatively connected to and slidably mounted on said control shaft.

3. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said guide being loosely received over said friction ring whereby said guide may be lifted off said friction ring and out of said housing.

4. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said housing including a removable cover, said guide and said means being carried by said cover, said guide being loosely received over said friction ring whereby said cover, said guide and said means may be removed as a unit.

5. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, guide rods carried by said housing, a guide housing freely slidably mounted on said rods, a guide pivotally mounted in said guide housing, said friction ring being guidedly engaged with said guide, and means for selectively pivoting said guide to tilt said friction ring whereby said cones will drive said friction ring along said cones to provide the desired drive ratio, said means including a gear segment on said guide, a control shaft, and a gear carried by said control shaft, said gear being in constant engagement with said gear segment.

6. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, guide rods carried by said housing, a guide housing freely slidably mounted on said rods, a guide pivotally mounted in said guide housing, said friction ring being guidedly engaged with said guide, and means for selectively pivoting said guide to tilt said friction ring whereby said cones will drive said friction ring along said cones to provide the desired drive ratio, said means including a gear segment on said guide, a control shaft, and a gear carried by said control shaft, said gear being in constant engagement with said gear segment, said control shaft being fixedly mounted in said housing for rotation only, said gear being operatively connected to and slidably mounted on said control shaft, said gear being retained relative to said gear segment by said guide housing.

7. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, and drive means for automatically actuating said gear, said drive means including a control system adapted to be attached to an internal combustion engine.

8. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, and drive means for automatically actuating said gear, said drive means including a control system adapted to be attached to an internal combustion engine, said control system including a master control unit responsive to an internal combustion engine's exhaust manifold pressure and intake manifold vacuum.

9. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, and drive means for automatically actuating said gear, said drive means including a reversible motor connected to said gear and a control system adapted to be attached to an internal combustion engine.

10. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, and drive means for automatically actuating said gear, said drive means including a reversible motor connected to said gear and a control system adapted to be attached to an internal combustion engine, said control system including a master control switch responsive to an internal combustion engine's exhaust manifold pressure and intake manifold vacuum.

11. A variable speed transmission comprising a supporting housing, a drive shaft journaled in said housing, a driven shaft journaled in said housing in spaced relation relative to said drive shaft, drive and driven cones carried by said shafts for rotation therewith, said cones tapering in opposite directions from each other, said cones being in spaced relation, a friction ring loosely surrounding one of said cones and having an intermediate portion disposed between and engaging said cones to drivingly connect said cones, a guide for said friction ring carried by said housing guidingly engaging said friction ring for movement between opposite ends of said cones, and means for selectively tilting said friction ring relative to said cones whereby said cones will drive said friction ring along said cones to provide the desired drive ratio, said means including a gear segment on said guide, a control shaft, and a gear carried by said control shaft, said gear being in constant engagement with said gear segment, and drive means for automatically actuating said gear, said drive means including a reversible motor connected to said gear and a control system adapted to be attached to an internal combustion engine, said control system including a master control switch responsive to an internal combustion engine's exhaust manifold pressure and intake manifold vacuum, and limit switches limiting movement of said friction ring relative to said cones.

References Cited in the file of this patent

UNITED STATES PATENTS

| | | |
|---|---|---|
| 760,460 | Leighton | May 24, 1904 |
| 1,637,664 | Stoekicht | Aug. 2, 1927 |
| 2,583,790 | Mikina | Jan. 29, 1952 |

FOREIGN PATENTS

| | | |
|---|---|---|
| 1,011,229 | France | Apr. 2, 1952 |
| 1,074,973 | France | Apr. 7, 1954 |